(12) United States Patent
Bellasalma

(10) Patent No.: US 6,835,338 B2
(45) Date of Patent: Dec. 28, 2004

(54) SYSTEM AND METHOD FOR MANUFACTURING A MOLDED ARTICLE

(75) Inventor: Gerard Jay Bellasalma, Yorba Linda, CA (US)

(73) Assignee: Masco Corporation, Taylor, MI (US)

( * ) Notice: Subject to any disclaimer, the term of this patent is extended or adjusted under 35 U.S.C. 154(b) by 259 days.

(21) Appl. No.: 10/124,784

(22) Filed: Apr. 17, 2002

(65) Prior Publication Data

US 2003/0197306 A1 Oct. 23, 2003

(51) Int. Cl.[7] .......................... B29C 41/32; B29C 44/06
(52) U.S. Cl. ................ 264/46.4; 264/255; 264/297.6; 264/309
(58) Field of Search ............... 264/46.4, 255, 264/309, 297.6

(56) References Cited

U.S. PATENT DOCUMENTS

| | | | | |
|---|---|---|---|---|
| 4,102,964 A | * | 7/1978 | Ridgeway | 264/511 |
| 4,629,595 A | * | 12/1986 | Ito | 264/104 |
| 5,116,557 A | * | 5/1992 | Debaes et al. | 264/46.6 |
| 6,090,323 A | * | 7/2000 | Izuhara et al. | 264/255 |
| 6,235,228 B1 | * | 5/2001 | Nicholl et al. | 264/255 |
| 6,355,193 B1 | * | 3/2002 | Stott | 264/46.5 |
| 6,555,037 B1 | * | 4/2003 | Payne | 264/40.7 |

* cited by examiner

Primary Examiner—Allan R. Kuhns
(74) Attorney, Agent, or Firm—Carlson, Gaskey & Olds

(57) ABSTRACT

A system of manufacturing a molded article includes a mold having first and second parts engagable to one another to form a cavity. A first mold part is fixed to a mold station. The second part of the mold is movable between a spray station adjacent the mold station. An enclosure disposed between the mold station and the spray station contains emissions from the spray station so that the mold station is not contaminated. The molded article is fabricated by applying a surface coating at the spray station into, shuttling the movable part of the mold into alignment with the fixed part of the mold, and filling the mold with a settable mixture. The second part of the mold is released from the first part, and shuttled back to the spray station for demolding of the completed molded article.

27 Claims, 4 Drawing Sheets

SYSTEM AND METHOD FOR MANUFACTURING A MOLDED ARTICLE

BACKGROUND OF THE INVENTION

This invention relates to a system and method of manufacturing a molded article from a settable mixture.

Typically molded articles are fabricated by injecting a settable mixture into a low-pressure mold installed into a molding machine. Bathtubs, and shower combinations and other large items are formed using this type of molding operation. Typically, the settable mixture includes a three-part mixture composed of a catalyst, a matrix polymer and a foaming agent.

In some manufacturing operations a preformed laminate is inserted into the mold and the settable mixture is injected into the mold and bonds to the preformed laminate to obtain the surface finish of the molded article. Another method of obtaining the desired surface finish of the molded article is to spray a surface coating onto the mold immediately before the molding operation. This method requires the application of the surface coating at a location substantially close to the molding operation such that within a limited time the mold is injected with the settable mixture. Emissions from the application of the surface coating are subject to government regulation and typically required to be separated from the molding operation such as in a spray booth having air scrubbers and other air treatment devices.

For these reasons it is desirable to develop a system and method of manufacturing a molded article where the surface coating may be applied to the mold sufficiently close to the mold while preventing emissions from the application process from interfering with the molding operation.

SUMMARY OF THE INVENTION

The invention is a system and method of producing a molded article from a settable mixture in a low pressure molding process including a mold having a fixed part disposed at a molding station and a movable part shuttled between the mold station and a spray station separated from the mold station by a retractable enclosure such that emissions from the spray station are separate from the molding process.

The system and method includes the application of a surface coating to a movable part of a mold at a spray station. During application of the surface coating at the spray station an enclosure around the spray station contains emissions from the spraying process. Once the surface coating is applied to the movable part of the mold the enclosure is retracted and the movable part of the mold shuttles to the mold station and is secured to the fixed part of the mold. The settable mixture is injected into the mold to form the molded article and bond with the surface coating. The mold is rotated during injection of the settable mixture to encourage the evacuation of air from the mold as the settable mixture fills the mold cavity. This feature is best described in co-pending patent application Ser. No. 10/134,231 entitled "Variable Feedback Molding System". Upon completion of the molding operation the movable part of the mold shuttles away from the mold station and the molded article is removed from the mold. A track system enables movement of the mold parts between the stations. In alternate embodiments of the manufacturing system the track interconnects multiple mold stations to a single common spray station such that emissions from the application of the surface coating are confined to one location and multiple mold stations provide increased manufacturing efficiencies.

The system and method of the subject invention provides for the manufacturing of a molded article having a surface coating applied sufficiently close to the mold station while preventing emissions from interfering with the molding operation and increasing manufacturing efficiency.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 2A is a side view of the movable mold part on a cart;

DETAILED DESCRIPTION OF THE PREFERRED EMBODIMENT

Figure 1:
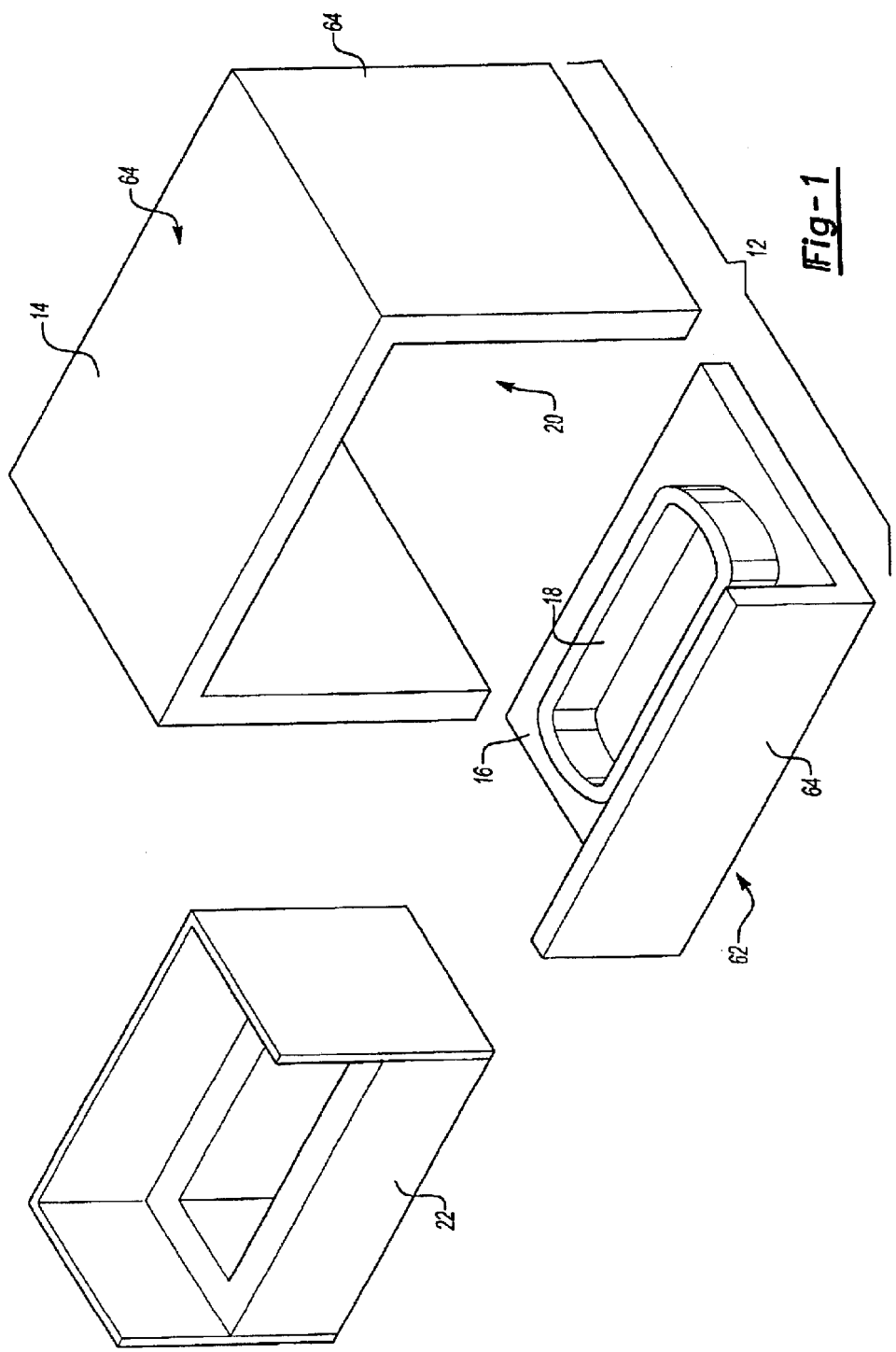
FIG. 1 shows a mold having a fixed part and a movable part.

Referring to the Figures, wherein like numerals indicate like or corresponding parts throughout the several views, the subject invention is a system and method for manufacturing a molded article utilizing a mold generally shown at 12 in FIG. 1. The mold 12 includes a fixed mold part 14 and a movable mold part 16. The movable mold part 16 preferably includes the male part 18 of the mold cavity 20. The fixed and movable mold parts 14,16 matingly engage to form the mold cavity 20 therebetween. The specific configuration of the mold cavity 20 determines the shape of the molded article 22. In the preferred embodiment the molded article 22 is an integral bathtub and shower surround.

Figure 2:
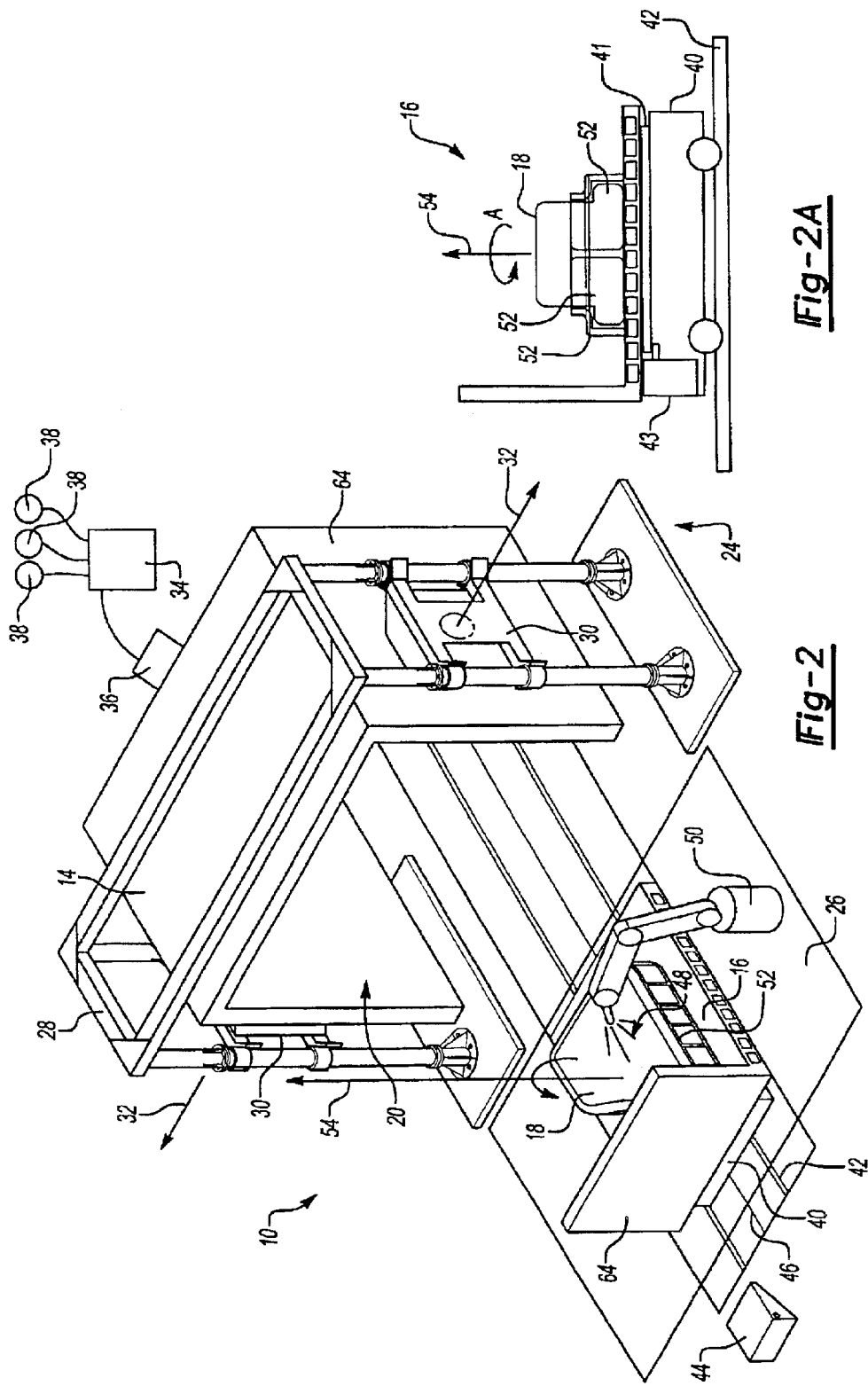
FIG. 2 is a perspective view of the subject manufacturing system.
Figure 3:
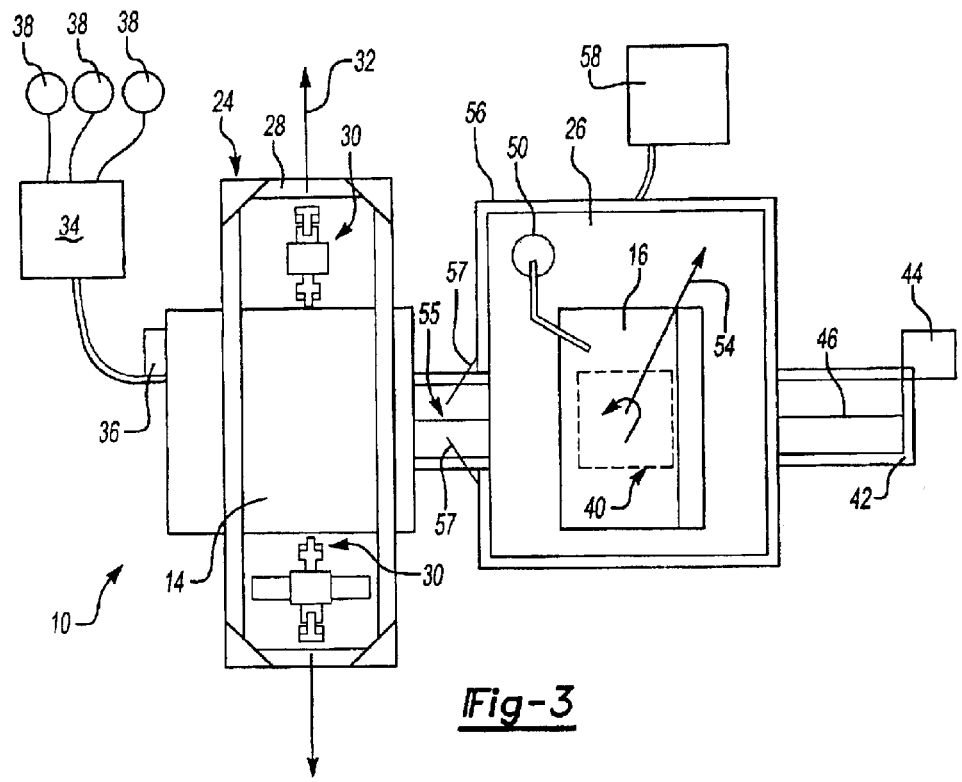
FIG. 3 is a schematic illustration of the manufacturing system.

Referring to FIGS. 2 and 3, preferably the movable mold part 16 is open on three sides to allow for the application of a surface coating to the male part 18 of the mold cavity and thereby the finished surface of the molded article 22. The fixed part 14 of the mold 12 is supported at a maid station 24. The mold station 24 includes a support structure 28 to which the fixed mold part 14 of the mold 12 is mounted. The support structure 28 includes mounts 30 attached to opposite sides of the mold 12. The mounts 30 provide for the fixed mold part 14 to be rotated about a horizontal axis 32. The mold station 24 also Includes a molding machine 34 for injecting a settable mixture into the mold cavity 20. The mold machine 34 includes a mixing head 36 attached to fill the fixed mold part 14 with the settable mixture. Each component of the settable mixture is metered out by the molding machine 34 to attain the proper ratio of components. The components of the settable mixture are stored within containers 38. Preferably the settable mixture includes a catalyst, a matrix polymer and a foaming agent.

The mold station 24 is positioned adjacent the spray station 26. The movable mold part 16 is supported by a cart 40 disposed on a track 42 extending between the mold station 24 a spay station 26. The cart 40 supports the movable mold part 16 during transportation between stations. The movable mold part 16 is released from the cart 40 at the molding station 24 such that the movable mold part 16 can be secured to and supported by the fixed mold part 14.

The track 42 includes a drive 44 connected to the cart 40 to shuttle the movable mold part 16 between stations 24, 26. Preferably the track 42 includes a chain 46 attached to the cart 40 and driven by the drive 44. The details of the track 42 and drive 44 may be as generally known by a worker knowledgeable in the art. The movable mold part 16 shuttles between the spray station 26 and the mold station 24 on the track 42. The track 42 guides the movable mold part 16 into proper alignment with the fixed mold part 14.

The movable mold part 16 is coated with a surface coating material indicated as spray 48 emanating from a spray robot 50 at the spray station 26. The surface coating material 48 can be applied by an operator utilizing a handheld spray gun (not shown) or with the spray robot 50. Further, a worker knowledgeable in the art would understand that any means of providing a surface coating would be within the contemplation of this invention.

Referring to FIG. 2A, the application of the surface coating 48 may include the mounting of masks 52 to the male part of the cavity 18. The purpose of the masks 52 is to prevent surface coating material 48 from being deposited on non-cavity portions of the movable mold part 16.

The application process at the spray station 16 also includes the rotation of the movable mold part 26 along a vertical axis 54. Rotation of the movable mold part 16 about the vertical axis 54 is indicated by the arrow A. The cart 40 provides for rotation of the mold along the vertical axis 54. Preferably the cart 40 includes a rotational support mechanism 41 driven by a motor 43. Details of the rotational support mechanism 41 and the motor 43 may be of any type as generally known in the art. Rotation of the movable mold part 16 simplifies removal of the completed molded article 22 by providing additional room for the manipulation and removal of the molded article 22. The close proximity of the spray station 26 to the mold station 24 complicates and increases the difficulty of removing the molded article 22 from the mold 12. Further rotation of the movable mold part 16 provides for simpler manipulation of spraying equipment when application of the surface coating 48 is to be accomplished by an operator utilizing a handheld spray gun (not shown).

Referring to FIG. 3, emissions from the surface coating 48 are prevented from migrating away from the spray station 26 by an enclosure 56. The enclosure 56 is positioned around the spray station 26 to contain emissions. The enclosure includes at least one entry opening 55 to allow the movable mold to enter and exit the enclosure 56. Further, the opening 55 includes a closure 57 to close off the opening 55 during the spraying of the surface coating 48. The closure 57 can be of any type known generally by a worker knowledgeable in the art. Preferably the enclosure 56 includes an exhaust assembly 58 removes emissions from the spray station 26 to prevent contamination of surrounding areas. Specific configurations of exhaust assemblies 58 for the removal of harmful emissions are generally known to those knowledgeable in the art.

Preferably, the movable mold part 16 is shuttled from the spray station 26 to the mold. station 24 to mate to the fixed mold part 14 such that the mold 12 is filled with the settable mixture. After the mold 12 is completely filled with settable mixture, the movable part 16 is released from the fixed mold part 14, returned to the cart 40 and shuttled away from the mold station 24. In one embodiment the movable mold part 16 shuttles back to the spray station 26 for demolding of the completed molded article 22.

Figure 4:
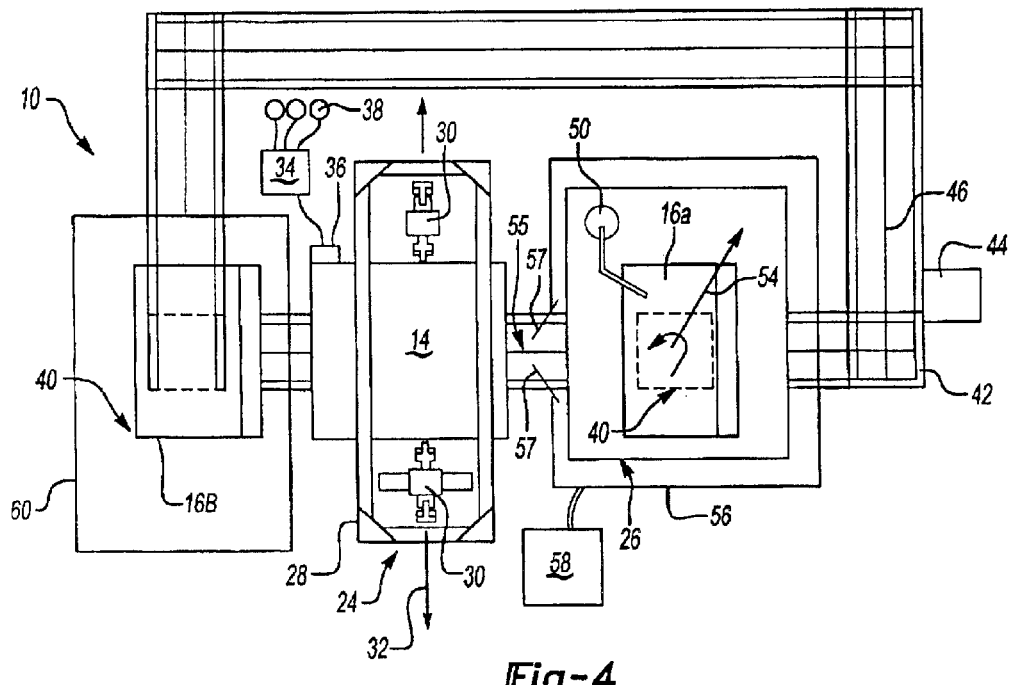
FIG. 4 is a schematic illustration of another embodiment of the manufacturing system including a demold station.

Referring to FIG. 4, in another embodiment tho manufacturing system 10 includes a separate demold station 60 disposed adjacent the mold station 24 and opposite the spray station 26 such that the movable mold part 16 is shuttled to the demold station 60 after the molding operation. Additional track 42 routes the movable mold part 16 from the demold station 60 back to the spray station 26. In this embodiment a first movable mold part 16a is released from the fixed mold part and moved clear of the fixed mold part 14 such that the first movable mold part 16a can be shuttled to the demolding station 60. A second movable mold part 16b can then immediately move into the mold station 24 to mate with the fixed mold part 14. Demolding at the demold station 60 eliminates mold station 24 idle time spent waiting for demolding of the molded article 22 and application of the surface coating 48. Further, the use of the demold station 44 provides for the use of multiple movable mold parts 16 to increase the efficiency of the manufacturing system 10 by decreasing mold station 24 idle time.

Figure 5:
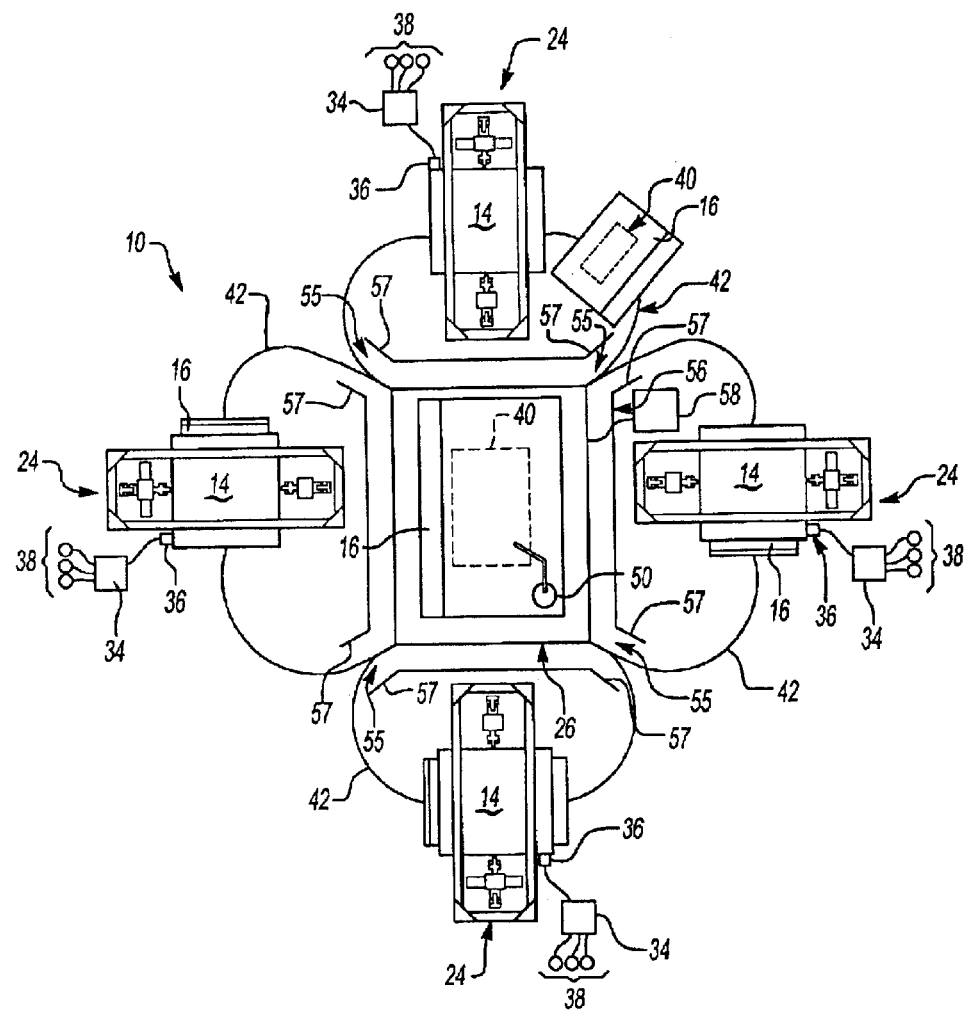
FIG. 5 is a schematic illustration of another embodiment of the manufacturing system having multiple mold stations and a single spray station.

Referring to FIG. 5, a schematic representation of a further embodiment of the subject manufacturing system 10 is shown that includes the use of at least one additional mold station 24 having a fixed mold part 14 and one additional movable mold part 16. The manufacturing system includes a plurality of fixed mold parts 14 and movable mold parts 16. Preferably there are four mold stations 24 disposed about and adjacent a common spray station 26. Preferably mold stations 24 are disposed about and adjacent the spray station 26. The track 42 is arranged to shuttle movable mold parts 16 between the common spray station 26 and the mold stations 24.

The movable mold part 16 shuttles between the spray station 26 and the additional mold stations 24 on the track 42. The track 42 includes a plurality of carts 40 to support and shuttle the movable mold parts 16 between the spray station 26 and the mold stations 24. The track 42 includes the drive 44 that operates to move the carts 40 along the track 42 between the mold stations 24 and the spray station 26. The movable part of the mold 12 is detachable from the cart 40, such that the movable mold parts 16 may be secured to the fixed mold part 14 and lifted from the cart 40 during the molding process.

The enclosure 56 includes a plurality of openings 55 and closures 57 to accommodate the multiple mold stations 24. The required exhaust assembly 58 at the spray station 26 is typically expensive, therefore by providing a single common spray station 26 to service multiple mold stations 24, the number of exhaust assemblies 58 required is minimized. The configuration shown in FIG. 5 is only one possible arrangement; other arrangements and positions of the mold station relative to a common spray station are within the contemplation of this invention.

The invention includes a method of manufacturing a molded article 22 from the settable mixture utilizing the mold 12 having a fixed part 14 at a mold station 24 and a movable part shuttled between a spray station 26 and the mold station 24.

Referring to FIG. 3, the method includes the steps of applying a surface coating 48 at the spray station 26 onto the male part of the cavity 18. Masks 52 are applied to the male part of the cavity 18 before the surface coating 48 is applied to prevent surface coating 48 from being deposited thereon. During the spraying operation the enclosure 56 contains emissions within the spray station 26 and the exhaust assembly evacuates the emissions.

After the application of the surface coating 48, the masks 52 are removed from the movable mold part 16. Referring to FIG. 1, preferably the movable mold part 16 is the male portion of the cavity 18 and includes only a bottom 62 and one side 64. The fixed mold part 14 includes the remaining sides 64 to complete the mold 12. Referring back to FIG. 3, in the preferred embodiment clearance between the spray station 26 and the mold station 24 is limited; therefore, the movable mold part 16 must rotate away from the mold station 24 to allow for removal of a completed molded article 22. The cart 40 supports and provides for rotation of the movable mold part 16. The cart 40 provides rotation of the movable mold part 16 about a vertical axis 54. Rotation of the movable mold part 16 allows the molded article 22 to slide out of the mold 12 and away from the movable mold part 16 in a direction away from the mold station 24. Because the movable mold part 16 is facing away from the mold station 24, upon completion of the application step, the movable mold part 16 must be rotated into alignment with the fixed mold part 14. Once the movable mold part 16 is rotated to face the fixed mold part 14, the movable mold part shuttles to and is secured to the fixed mold part 14.

Once the mold parts 14,16 are secured together the settable mixture is introduced into the mold cavity 20 by the molding machine 34 through the mixing head 36. During the filling process the mold 12 is rotated about the horizontal axis 32 to exhaust air trapped within the mold 12. After completely filling the mold cavity 20, the movable mold part 16 is released from the fixed mold part 14 and shuttled back to the spray station 26, where the movable mold part 16 is rotated away from the mold station 24 for demolding of the molded article 22.

Referring to FIG. 4, another embodiment of the method, the manufacturing system 10 includes the demold station 60 adjacent the mold station 24 and on a side opposite the spray station 26. In this embodiment, the movable mold part 16 shuttles to the demold station 60 after the filling operation for removal of the completed molded article 22.

In another embodiment of the method, the manufacturing system shown schematically in FIG. 5 includes a plurality of mold stations disposed about a common spray station 26. The single common spray station 26 services the multiple mold stations 24 to reduce the need for multiple enclosures and air handling assemblies 54. A plurality of movable mold parts 16 are shuttled between the spray station 26 and the multiple mold stations 26. The single spray station 26 provides for the containment of emissions from the surface coating 48 in a single area.

The method includes the steps of applying the surface coating 48 at the single spray station 26 onto the male part of the cavity 18 disposed on a first movable mold part 16. The application step of the method includes the application of masks 52 to mask off portions of the movable mold part 16 to prevent application of the surface coating 48 to certain potions of the movable mold part 16. The first movable mold part 16 is then shuttled into alignment with one of the fixed mold parts 14 at one of the mold stations 24.

The molding process in then executed by securing the movable mold part 16 to the fixed mold part 14, filling the mold 12, then releasing the movable mold part 16 from the fixed mold part 14. The movable mold part 16 is then shuttled away from the mold station 24 for demolding of the molded article 22. Preferably in this embodiment at least one of the plurality of movable mold parts 16 is at the spray station and at least one of the plurality of movable mold parts 16 is at one of the mold stations 24 such that the surface coating 48 is being applied to at least one of the movable molds 16 and another movable mold part 16 is attached to the fixed mold part 14 and being filled with the settable mixture to form the molded article 22.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A method or manufacturing a molded article from a settable mixture utilizing a mold tool having a fixed part at a mold station and a movable part shuttled between a spray station and the mold station, said method comprising the steps of:
   a. applying a surface coating at the spray station onto a molding surface of the movable mold part of the mold;
   b. shuttling the movable part of the mold into alignment with the fixed part of the mold;
   c. securing the movable part of the mold to the fixed part of the mold;
   d. filling the mold with the settable mixture prior to solidification of the surface coating such that the settable mixture bonds to the surface coating;
   e. releasing the movable part of the mold from the fixed part of the mold;
   f. shuttling the movable part of the mold away from the mold station; and
   g. demolding the molded article from the mold.

2. The method of claim 1, wherein said step b. is further defined by rotating the movable mold part such that an open portion of the mold faces away from the mold station.

3. The method of claim 1, wherein said step b. further includes the step of rotating the movable part of the mold into alignment with the fixed part of the mold.

4. The method of claim 2, wherein said step a. is further defined by masking portions of the movable mold not requiring the surface coating.

5. The method of claim 1, wherein the spray station includes an enclosure to contain emissions, and said method further includes the step of moving the enclosure into a spay position before applying the surface coating and retracting the enclosure upon completion of said applying the surface coating step.

6. The method of claim 1, further including a demold station disposed adjacent the mold station on a side opposite the spray station.

7. The method of claim 6, wherein said method further includes the step of shuttling the movable mold part to the demold station to demold the molded article.

8. The method of claim 1, wherein said movable mold is shuttled between the mold station and the spray station along a track.

9. The method of claim 1, including at least two mold stations, one spray station and a track for shuttling a plurality of movable molds between said one spray station and the mold stations such that emissions from the applying of the surface coating are contained in a predetermined area.

10. The method of claim 9, wherein said spray station is disposed in a central location and said plurality of mold stations are positioned about said spray station.

11. The method as recited in claim 1, including the step of mixing at least two components to form the settable mixture within a mixing head.

12. The method as recited in claim 1, wherein the settable mixture includes a catalyst, a matrix polymer and a foaming agent.

13. The method as recited in claim 1, wherein the spray station is immediately adjacent the mold station.

14. A method of manufacturing a molded article from a settable mixture said method comprising the steps of:
   a. applying a surface coating at a spray station onto a molding surface of one of a plurality of movable mold parts of a mold;
   b. shuttling the movable mold part into alignment with one of a plurality of fixed mold parts disposed at one of a plurality of mold stations;
   c. securing one of the plurality of movable mold parts to one of the plurality of fixed mold parts;
   d. filling the secured movable mold part and the fixed mold part with the settable mixture prior to solidification of the surface coating such that said settable mixture bonds with the surface coating;
   e. releasing the movable mold part from the fixed mold part;
   f. shuttling the movable mold part away from the mold station; and demolding the molded article.

15. The method of claim 14, wherein at least one of said plurality of movable mold parts is at said spray station and at least one of said plurality of movable mold parts is at one of said mold stations.

16. The method of claim 14, wherein at least one of said plurality of movable molds is at said step a. and another of said plurality of movable molds is concurrently at said step d.

17. The method of claim 14, wherein said plurality of mold stations are disposed adjacent said spray station.

18. The method of claim 14, including a track system disposed between said spray station and said plurality of mold stations, and said movable mold parts are movable along said track system.

19. The method of claim 18, wherein said track system further includes a plurality of carts for supporting and shuttling said movable mold parts.

20. The method of claim 19, wherein the movable mold part is removable from said cart such that the movable mold part can be secured to the fixed mold part.

21. The method of claim 14, wherein said step a. is accomplished utilizing a spray robot.

22. The method of claim 14, wherein said step a. includes enclosing said spray station to contain emissions.

23. The method of claim 14, wherein said step a. includes evacuating emissions from said spray station.

24. The method of claim 14, further defined by shuttling a first movable mold part to one of said mold stations, shuttling said first movable mold part away from said mold station on completion of said step d. and shuttling a second movable mold part to said mold station.

25. The method of claim 14, wherein said step a. includes masking off portions of said movable mold to prevent application of the surface coating to certain potions of said movable mold.

26. The method as recited in claim 14, including the step of mixing at least two components to form the settable mixture within a mixing head.

27. The method as recited in claim 14, wherein the settable mixture includes a catalyst, a matrix polymer and a foaming agent.

* * * * *